United States Patent [19]

Kawame et al.

[11] Patent Number: 5,237,027
[45] Date of Patent: Aug. 17, 1993

[54] ALKALINE WATER-SOLUBLE THERMOPLASTIC RESIN AND ADHESIVE COMPRISING THE SAME

[75] Inventors: Toshimitu Kawame; Yoshiki Nobuto; Atsushi Ooishi; Shobu Minatono, all of Kashima, Japan

[73] Assignee: Kuraray Company, Ltd., Kurashiki, Japan

[21] Appl. No.: 929,011

[22] Filed: Aug. 13, 1992

[30] Foreign Application Priority Data

Aug. 22, 1991 [JP] Japan .................................. 3-235484
Mar. 26, 1992 [JP] Japan .................................. 4-100372

[51] Int. Cl.$^5$ .......................................... C08F 222/04
[52] U.S. Cl. .................................................. 526/272
[58] Field of Search .......................................... 526/272

[56] References Cited

U.S. PATENT DOCUMENTS 3,297,654  1/1967  Barr et al.

FOREIGN PATENT DOCUMENTS

| 4420993 | 4/1963 | Japan | 526/272 |
| 61-87714 | 5/1986 | Japan | 526/272 |
| 61-138679 | 6/1986 | Japan | 526/272 |
| 62-288620 | 12/1987 | Japan | 526/272 |
| 1028231 | 5/1966 | United Kingdom | 526/272 |
| 1087297 | 10/1967 | United Kingdom | 526/272 |

OTHER PUBLICATIONS

Chemical Abstracts, vol. 105, No. 22, 1 Dec. 1986, Columbus, Ohio, U.S.; Abstract No. 191809, "Isobutylene-Maleic Anhydride-ME Acrylate Terpolymer", p. 14; col. 1; *Abstract* & JP-A-6 187 714 (Idemetsu Petrochemical Co. Ltd.).

Chemical Abstracts, vol. 114, No. 20, 20 May 1991, Columbus, Ohio, U.S.; Abstract No. 186331, "Manufacture of Maleic Anhydride Terpolymers with Vinyl and Acrylic Compounds", *Abstract* & PL-A-149 613 (Poliechnika Warszawska).

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

The present invention provides an alkaline water-soluble thermoplastic resin comprising units from isobutylene, units from maleic anhydride and units from n-butyl acrylate unit in a molar ratio of isobutylene units, maleic anhydride units and n-butyl acrylate units of 1:0.8–1.2:0.2–5.0.

6 Claims, No Drawings

ALKALINE WATER-SOLUBLE THERMOPLASTIC RESIN AND ADHESIVE COMPRISING THE SAME

BACKGROUND OF THE INVENTION

1. Field of the Invention

The present invention relates to a thermoplastic resin soluble in aqueous alkaline solution and, more specifically, to a thermoplastic resin soluble in aqueous alkaline solution and comprising a terpolymer of isobutylene, maleic anhydride and n-butyl acrylate.

2. Description of the Related Art

Alkaline water-soluble thermoplastic resins have been used as raw materials for preparing aqueous adhesives, water-based paints, etc. Isobutylene-maleic anhydride copolymer is well known among such resins.

The isobutylene-maleic anhydride copolymer does not have substantial thermoplasticity because it has a very high melt viscosity and a comparatively low thermal degradation (decarbonation) initiating temperature. The copolymer therefore has been unable to be used for applications which utilize the meltability of the resin, such as hot-melt type pressure-sensitive adhesive and bonding adhesive and modifier for plastics and the like. Further the isobutylene-maleic anhydride copolymer has only limited applications because it is rigid and brittle and shows no substantial thermoplasticity and has poor processability.

To solve these problems, there has been proposed addition of a third copolymerizable component of monoethylenically unsaturated monomer, particularly an acrylic ester having a lower glass transition point, which improves the rigid and brittle properties of the isobutylene-maleic anhydride copolymer (U.S. Pat. No. 3,297,654, Japanese Patent Publication Nos. 7286/1965 and 20993/1969).

However, the methyl acrylate, ethyl acrylate and 2-ethylhexyl acrylate that are specifically illustrated in the above described U.S. Pat. No. 3,297,654, Japanese Patent Publication Nos. 7286/1965 and 20993/1969 have the following problems.

Methyl acrylate or ethyl acrylate does not have large capacity to soften (internal plasticization) the copolymer that forms upon its copolymerization with other monomers. It should there be copolymerized in a large amount for the purpose of improving the rigid and brittle properties of the isobutylene-maleic anhydride copolymer, which in turn decreases the solubility of the obtained copolymer in aqueous alkaline solutions to a large extent.

Although ethylhexyl acrylate has a satisfactory capability of softening the resulting copolymer, it has the problem of too low a reactivity upon copolymerization with isobutylene and maleic anhydride, thereby hardly yielding a copolymer having uniform composition.

Acrylic acid esters with the number of carbon atoms being similar to that of n-butyl acrylate, i.e. n-propyl acrylate, n-pentyl acrylate and n-hexyl acrylate, which are not specifically illustrated in the above U.S. Pat. No. 3,297,654, Japanese Patent Publication Nos. 7286/1965 or 20993/1969 though, are also unsuitable for the purpose of the present invention because of the following problems, in addition to their industrial unavailability.

N-propyl acrylate, which is an acrylic acid ester having a smaller number of carbon atoms than n-butyl acrylate, has no problem with respect to copolymerization reactivity with isobutylene and maleic anhydride, but is inferior in the improvement effect of internal plasticization and improves the thermal degradation initiating temperature only to a small extent.

N-pentyl acrylate and n-hexyl acrylate, which are acrylic acid esters having a larger number of carbon atoms than n-butyl acrylate, produces, like 2-ethylhexyl acrylate, a satisfactory effect as a softening constituent but is unsatisfactory in copolymerization reactivity with isobutylene and maleic anhydride, thereby producing the resulting copolymer in a low yield and rendering it difficult to obtain a copolymer having uniform composition.

An object of the present invention is to solve these problems and to provide an alkaline water-soluble thermoplastic resin being, while containing units from isobutylene and units from maleic anhydride, free from those drawbacks inherent to conventional isobutylene-maleic anhydride copolymers, i.e. low thermal degradation initiating temperature, poor heat processability and rigid and brittle features, and having superior film properties such as flexibility and tensile strength.

SUMMARY OF THE INVENTION

The present inventors have found that the above object can be achieved by copolymerizing n-butyl acrylate with isobutylene and maleic anhydride in a specific molar ratio and completed the invention.

Thus, the present invention provides an alkaline water-soluble thermoplastic resin comprising units from isobutylene, units from maleic anhydride and units from n-butyl acrylate with their molecular composition ratio being in the range of 1:0.8–1.2:0.2–5.0.

DETAILED DESCRIPTION OF THE PREFERRED EMBODIMENTS

The feature of the present invention lies, upon copolymerization of isobutylene and maleic anhydride, in further copolymerizing in a specific molar ratio range n-butyl acrylate, which can soften them and elevate the thermal degradation initiating temperature of the resulting coplymer and has comparatively high copolymerization reactivity.

As described above, the alkaline water-soluble thermoplastic resin of the present invention is a terpolymer comprising isobutylene units, maleic anhydride units and n-butyl acrylate units, with their molar ratios being in specific ranges. Where the molar ratio of the n-butyl acrylate units is too small, the thermal degradation initiating temperature rises insufficiently and the effect of improving thermoplasticity and film characteristics, especially flexibility, are produced only to a small extent.

On the other hand, where the molar ratio of the n-butyl acrylate is too large, the amount of the maleic anhydride units in the copolymer tend to decrease to a large extent, resulting in a large reduction in solubility in aqueous alkaline solution. Therefore, the molar ratio of isobutylene units, maleic anhydride units and n-butyl acrylate units of the alkaline water-soluble thermoplastic resin, i.e isobutylene-maleic anhydride-n-butyl acrylate terpolymer, is in a range of 1:0.8–1.2:0.2–5.0, preferably in a range of 1:0.9–1.1:0.4–3.0.

The molecular weight of the alkaline water-soluble thermoplastic resin of the present invention is preferably 5000–500,000, more preferably 10,000–300,000 in view of heat processability, film characteristics and the like.

The alkaline water-soluble thermoplastic resin of the present invention, which contains maleic anhydride units, can be made soluble in aqueous alkaline solution by hydrolyzing the acid anhydride bonds with an alkali such as ammonia water or aqueous sodium hydroxide solution. The terpolymer of the present invention can be modified by the reaction of the acid anhydride bonds with other compounds. For instance, it can be modified by esterification with an alcohol, by amidation with an amine or by cross-linking with a multifunctional compound.

The alkaline water-soluble thermoplastic resins of the present invention can be prepared by any of conventional processes using isobutylene, maleic anhydride and n-butyl acrylate as starting materials. For example, a reaction vessel is charged with these starting materials, and solution polymerization or precipitation polymerization is effected in the presence of a radical polymerization initiator.

The radical polymerization initiator is suitably selected from among known ones. Suitable examples of the radical polymerization initiator include organic peroxides such as di(dodecanoyl) peroxide, benzoyl peroxide, cumene hydroperoxide and t-butyl hydroperoxide, and azo compounds such as 2,2'-diazobisbutyronitrile, 2,2'-azobis(2-methylbutyronitrile), dimethyl-2,2'-azobisisobutyrate and $\alpha,\alpha'$-azo-$\alpha$-ethylbutyronitrile. The amount of radical polymerization initiator used is in general about 0.05–5.0 parts by weight based on 100 parts by weight of the monomers.

As the solvent used for the polymerization reaction in the present invention, various solvents which do not inhibit the polymerization reaction can be used. Examples of the solvent include ketones such as acetone and methyl ethyl ketone, aliphatic hydrocarbons such as n-hexane and n-octane, aromatic hydrocarbons such as benzene and toluene, aliphatic ester such as ethyl acetate and isopropyl acetate, ethers such as diisopropyl ether, dioxane and tetrahydrofuran, chlorinated hydrocarbons such as methylene chloride and chloroform. These solvents can be used singly or in combination.

The polymerization temperature varies depending on the solvent and radical polymerization initiator used and like factors, but is in general in a range of 0° to 200° C., preferably 30° to 150° C. The polymerization period also varies depending on the solvent, the radical polymerization initiator, the polymerization temperature and the like, but is in general in a range of 1–50 hours, preferably in a range of 2–20 hours. The polymerization reaction is in general carried out under atmospheric pressure or under higher pressure.

The alkaline water-soluble thermoplastic resin is separated and recovered from the reaction mixture after completion of polymerization by any of known processes. With precipitation polymerization, the objective polymer can be recovered by separating the precipitated polymer by filtration, and then dehydrating and drying it. With solution polymerization, the objective polymer can be recovered by distilling off the solvent and then drying the residue.

The starting materials of the alkaline water-soluble thermoplastic resin of the present invention, i.e. isobutylene, maleic anhydride and n-butyl acrylate, differ in reactivity from each other to some extent. The molar ratio of these monomers fed therefore do not exactly constitute, as they are, the molar ratio of the corresponding structural units of the copolymer of the present invention. It is, however, generally desirable to feed the monomers in the same molar ratio as that of the structural units of the alkaline water-soluble thermoplastic resin of the present invention. That is, the molar ratio of the isobutylene, maleic anhydride and n-butyl acrylate to be fed is preferably in a range of 1:0.8–1.2:0.2–5.0. Since the molar ratio can be changed with this specific range, there can be obtained various thermoplastic resins of the present invention having different characteristics such as softening point, melt viscosity, thermal degradation resistance, film properties and solubility in alkaline water.

Upon feeding of the starting monomers, copolymers having a uniform composition can be obtained by feeding them while taking into consideration difference in their polymerization reactivities. For example, it is desirable to so feed low reactive n-butyl acrylate that its concentration will become high at the starting step and, on the other hand, to feed maleic anhydride such that its concentration keeps constant throughout the polymerization period.

In the preparation of the alkaline water-soluble thermoplastic resins of the present invention, upon copolymerization of the starting material isobutylene and maleic anhydride, there is also copolymerized in a specific molar ratio n-butyl acrylate that has a relatively high copolymerization reactivity and the property of improving the softening point and the thermal degradation initiating temperature of the resulting copolymer. As a result, it becomes possible to elevate the thermal degradation initiating temperature of the obtained resin and to improve its heat processability.

According to the present invention, it has been found that the above alkaline water-soluble thermoplastic resins exhibit excellent bonding characteristics when used as ingredient of adhesives. The alkaline water-soluble thermoplastic resins useful for this purpose are terpolymers comprising isobutylene units, maleic anhydride units and n-butyl acrylate units in a molar ratio of 1:0.5–1.5:0.2–5.0. These terpolymers provide hot-melt type adhesives when they are used in melted state or solvent-type adhesives when they are used while being dissolved in an organic solvent.

The above hot-melt type adhesives are characterized by high water resistance and bonding strength, as well as good solubility in alkaline water.

In preparation of the alkaline water-soluble hot-melt type adhesive, if the molar ratio of n-butyl acrylate units is smaller than the specified range, the resulting copolymer will have too high a melting point to be usable as a hot-melt adhesive. If the molar ratio of n-butyl acrylate units is larger than the specified range and that of maleic anhydride units is smaller than the specified range, the resulting copolymer will have poor solubility in alkaline water. The molar ratio of isobutylene, maleic anhydride and n-butyl acrylate therefore should be in a range of 1:0.5–1.5:0.2–5.0.

It is desirable that the copolymer of the present invention have a molecular weight in a range of 5,000 to 500,000. Copolymers with too small a molecular weight have insufficient adhesiveness, while showing low melting viscosity though. Copolymers with too large a molecular weight having large adhesiveness, show too high melt viscosity.

The terpolymer of the present invention is insoluble in normal water, but it becomes soluble in water by neutralizing the intramolecular maleic anhydride units with an alkali such as ammonia or sodium hydroxide. Accordingly, the hot-melt type adhesive of the present invention has a sufficient water resistance under normal application conditions, but becomes, when necessary, removable by dissolution with an alkaline water, which is desirable for applications where it is expected that waste paper be recycled or beverage containers be reused.

When the terpolymer is to be dissolved in an alkaline water, it is desirable to heat the water to accelerate dissolution rate.

The terpolymer of the present invention, which contains highly polar maleic anhydride and n-butyl acrylate units, has a superior bond performance when applied to polar materials such as metals, glasses, ceramics, papers, woods, ABS resins, acrylic resins and polyvinyl chloride resins.

Several additives can be incorporated into the hot melt type adhesives. Examples of the additives are tackifiers such as rosin and modified rosinate esters, anti-oxidants, fillers and melt-viscosity depressants. It is also possible to incorporate thermoplastic resins such as EVA, polyolefins and polyesters and thermoplastic elastomers such as SEBS, SEPS and SBS within limits not to impair the alkaline water solubility or dispersibility to a large extent. The hot-melt type adhesives can be used in combination with other water-soluble hot-melt type adhesives such as hot-melt type modified PVA.

The afore-described solvent-type adhesive is characterized not only by a superior adhesiveness to polar materials such as metals, glasses, ceramics, papers and woods, as well as ABS resins, acrylic resins and polyvinyl chloride resins, but by solubility in alkaline water which assures re-peelability.

With the solvent-type adhesive, too small an n-butyl acrylate unit content limits the number of organic solvents that can dissolve the copolymer. On the other hand, too large a content of n-butyl acrylate units, i.e. too small a content of maleic anhydride units leads to poor solubility in alkaline water. The molar ratio of isobutylene units, maleic anhydride units and n-butyl acrylate units should therefore by in a range of 1:0.5–1.5:0.2–5.0.

It is desirable that the copolymer used for the solvent-type adhesive of the present invention have a molecular weight in a range of 5,000 to 500,000. Copolymers with too small a molecular weight have insufficient adhesiveness, while showing low solution viscosity though. Copolymers with too large a molecular weight, having large adhesiveness, show too high solution viscosity.

The terpolymer of the present invention is insoluble in normal water, but it becomes soluble in water by neutralizing the intramolecular maleic anhydride units with an alkali such as ammonia or sodium hydroxide. Accordingly, the solution-type adhesive of the present invention has a sufficient water resistance under normal application conditions, but becomes, when necessary, removable by dissolution with an alkaline water, which is desirable for applications where it is expected that waste paper be recycled or beverage containers be reused.

When the terpolymer is to be dissolved in an alkaline water, it is desirable to heat the water to accelerate dissolution rate.

The terpolymer of the present invention, which contains highly polar maleic anhydride and n-butyl acrylate units, has a superior bond performance when applied to polar materials such as metals, glasses, ceramics, papers, woods, ABS resins, acrylic resins and polyvinyl chloride resins.

Any solvent that can dissolve the terpolymer can be used with no particular limitation for the solvent type adhesive of the present invention and its example are ketones such as acetone, methylethyl ketone and methylisobutyl ketone, acetic acid esters such as methyl acetate, ethyl acetate and butyl acetate, organic chlorides such as dichloromethane and trichloromethane, aromatic hydrocarbons such as benzene and toluene. These solvents can be used singly or in combination.

The solvent-type adhesive may incorporate several additives. Example of the additives are tackifiers such as rosins and modified rosinate esters, antioxidants, fillers, plasticizers, thickening agents, defoamers and leveling agents. Also, natural rubber, synthetic rubbers, phenolic resins, urethane resins, vinyl resins, acrylic resins and the like may be incorporated within limits not to impair the alkaline water solubility or dispersibility of the terpolymer.

Other features of the invention will become apparent in the course of the following description of exemplary embodiments which are given for illustration of the invention and are not intended to be limiting thereof.

EXAMPLES

Example 1

A 1-liter autoclave equipped with a stirrer was charged with 238.8 g of acetone, 3.9 g (0.04 mole) of maleic anhydride, and 64.1 g (0.5 mole of n-butyl acrylate, and the mixture was stirred for 30 minutes to give a solution. Thereafter, the air in the autoclave was replaced by nitrogen, and the autoclave was charged with 26.9 g (0.48 mole) of isobutene, and the mixture was heated up to 70° C.

Then a separately prepared solution of 1.97 g (0.012 mole) of 2,2'-azobisisobutyronitrile, 35.3 g (0.36 mole) of maleic anhydride and 38.5 g (0.3 mole) of n-butyl acrylate in 59.7 g of acetone was continuously fed over 5 hours, and polymerization was further effected at 70° C. for 3 hours.

After completion of the polymerization, the reaction mixture was taken out of the autoclave, air-dried overnight, and further dried at 80° C. under reduced pressure to give 162.1 g of an alkaline water-soluble thermoplastic resin according to the present invention. The molar ratio of isobutylene units, maleic anhydride units, and n-butyl acrylate units of the obtained resin was determined by $^1$H—NMR spectroscopy and found to be 1:1.0:1.9.

The properties of the obtained resin were found to be as follows.

1. Average molecular weight (determined by GPC and converted based on polystyrene):
Number average molecular weight=31,300.
Weight average molecular weight=87,700.
2. Acid value: 281 mgKOH/g.
3. Glass transition point (determined by DSC): 14° C.
4. Thermal degradation initiating temperature (determined by TGA, in $N_2$ atmosphere): 246° C.
5. Infrared absorption spectra:
1,390 cm$^{-1}$ (originating from isobutylene unit).
1,370 cm$^{-1}$ (originating from isobutylene unit).
1,850 cm$^{-1}$ (originating from maleic anhydride).
1,770 cm$^{-1}$ (originating from maleic anhydride).
1,730 cm$^{-1}$ (originating from n-butyl acrylate).

The obtained resin was heat-press molded at 150° C. into a sheet with a thickness of 0.5 mm. The obtained sheet was tested for tensile properties using Instron (Trade name, manufactured by Instron Japan Incorp.) at an extension rate of 50 mm/min. The obtained results were as follows.

Tensile Test

Tensile breaking strength: 42 kg/cm$^2$.
Tensile breaking elongation: 84%.

Separately, 10 g of the obtained resin was dissolved in 68.7 g of an aqueous sodium hydroxide solution (containing 1.8 g of NaOH) at 90° C. for 4 hours with stirring to give a transparent aqueous solution having a pH of 10.6 and a viscosity of 146 cps (at 30° C.).

The alkaline water-soluble thermoplastic resin of the Example was thus superior in heat processability, and gave a film having excellent properties and showing excellent solubility in aqueous alkaline solution.

Example 2

A 1-liter autoclave equipped with a stirrer was charged with 127.9 g of acetone, 14.7 g (0.15 mole) of maleic anhydride and 17.9 g (0.14 mole) of n-butyl acrylate, and the mixture was stirred for 30 minutes to give a solution. Thereafter, the air in the autoclave was replaced by nitrogen, and the autoclave was charged with 30.9 g (0.55 mole) of isobutene, and the mixture was heated up to 70° C.

Then a separately prepared solution of 1.15 g (0.007 mole) of 2,2'-azobisisobutyronitrile, 34.3 g (0.35 mole) of maleic anhydride and 7.7 g (0.06 mole) of n-butyl acrylate in 60.0 g of acetone was continuously fed over 5 hours, and polymerization was further effected at 70° C. for 3 hours.

After completion of the polymerization, the reaction mixture was taken out of the autoclave, air-dried overnight, and further dried at 80° C. under reduced pressure to give 98.7 g of an alkaline water-soluble thermoplastic resin according to the present invention. The molar ratio of isobutylene units, maleic anhydride units, and n-butyl acrylate units of the obtained resin was determined by $^1$H—NMR spectroscopy and found to be 1:1.0:0.39.

The properties of the obtained resin were found to be as follows.

1. Average molecular weight (determined by GPC and converted based on polystyrene):
   Number average molecular weight=36,100.
   Weight average molecular weight=96,300.
2. Acid value: 549 mgKOH/g.
3. Glass transition point (determined by DSC): 71° C.
4. Thermal degradation initiating temperature (determined by TGA, in N$_2$ atmosphere): 239° C.
5. Infrared absorption spectra:
As in Example 1, the absorption spectra of each structural unit were identified.

The obtained resin was heat-press molded at 150° C. into a sheet with a thickness of 0.5 mm. The obtained sheet was tested for tensile properties using Instron (Trade name, manufactured by Instron Japan Incorp.) at an extension rate of 50 mm/min. The obtained results were as follows.

Tensile Test

Tensile breaking strength: 76 kg/cm$^2$.
Tensile breaking elongation: 12%.

Separately, 10 g of the obtained resin was dissolved in 80 g of an aqueous sodium hydroxide solution (containing 3.5 g of NaOH) at 90° C. for 4 hours with stirring to give a transparent aqueous solution having a PH of 9.8 and a viscosity of 280 cps (at 30° C.).

The alkaline water-soluble thermoplastic resin of the Example was thus superior in heat processability, and gave a film having excellent properties and showing excellent solubility in aqueous alkaline solution.

Comparative Example 1

A 1-liter autoclave equipped with a stirrer was charged with 131.7 g of acetone, 17.7 g (0.18 mole) of maleic anhydride and 5.4 g (0.042 mole) of n-butyl acrylate, and the mixture was stirred for 30 minutes to give a solution. Thereafter the air in the autoclave was replaced by nitrogen, and the autoclave was charged with 37.0 g (0.66 mole) of isobutene, and the mixture was heated up to 70° C.

Then a solution of 1.08 g (0.0066 mole) of 2,2'-azobisisobutyronitrile, 41.2 g (0.42 mole) of maleic anhydride and 2.3 g (0.018 mole) of n-butyl acrylate in 50.0 g of acetone was continuously fed over 5 hours, and polymerization was further effected at 70° C. for 3 hours.

After completion of polymerization, the reaction mixture was taken out of the autoclave, air-dried overnight, and further dried at 80° C. under reduced pressure to give 97.8 g of a terpolymer. The molar ratio of isobutylene units, maleic anhydride units and n-butyl acrylate units of the terpolymer was determined by $^1$H-NMR spectroscopy to be 1:1.0:0.10.

The properties of the obtained terpolymer were found to be as follows.

1. Average molecular weight (determined by GPC and converted based on polystyrene):
   Number average molecular weight=27,300.
   Weight average molecular weight=79,700.
2. Acid value: 670 mgKOH/g.
3. Glass transition point (determined by DSC): 126° C.
4. Thermal degradation initiating temperature (determined by TGA, in N$_2$ atmosphere): 154° C.

An attempt was made to, as in Example 1, to heat press the obtained terpolymer at 150° C. The desired sheet could not be formed because the molding temperature of 150° C. was near the thermal degradation initiating temperature and did not differ largely from the glass transition point, of the terpolymer and that the terpolymer hence was not sufficiently melted. Separately, the solution in acetone on completion of the copolymerization was casted and dried into a film. The obtained film was rigid and very brittle.

Comparative Example 2

A 1-liter autoclave equipped with a stirrer was charged with 238.4 g of acetone, 3.9 g (0.04 mole) of maleic anhydride and 89.7 g (0.7 mole) of n-butyl acrylate, and the mixture was stirred for 30 minutes to give a solution. Thereafter the air in the autoclave was replaced by nitrogen, and the autoclave was charged with 13.5 g (0.24 mole) of isobutene, and the mixture was heated up to 75° C.

Then a separately prepared solution of 2.30 g (0.014 mole) of 2,2'-azobisisobutyronitrile, 15.7 g (0.16 mole) of maleic anhydride and 89.7 g (0.7 mole) of n-butyl acrylate in 100 g of acetone was continuously fed over 6 hours, and polymerization was further effected at 75° C. for 3 hours.

After completion of the polymerization, the reaction mixture was taken out of the autoclave, air-dried overnight, and further dried at 80° C. under reduced pressure to give 198.2 g of a soft terpolymer being tacky at room temperature. The molar ratio of isobutylene units, maleic anhydride units and n-butyl acrylate units of the terpolymer was determined by $^1$H—NMR spectroscopy to be 1:1.0:6.9.

The properties of the obtained terpolymer were found to be as follows.

1. Average molecular weight (determined by GPC and converted based on polystyrene):
   Number average molecular weight=19,800.
   Weight average molecular weight=62,600.
2. Acid value: 118 mgKOH/g.
3. Glass transition point (determined by DSC): −28° C.
4. Thermal degradation initiating temperature (determined by TGA, in $N_2$ atmosphere): 248° C.

Since the obtained terpolymer was a soft polymer being tacky at room temperature, it could not be formed into the desired sheet. Separately, 10 g of the terpolymer was placed in 61.77 g of an aqueous sodium hydroxide solution (containing 0.77 g of NaOH) at 90° C. and the mixture was stirred for 4 hours. However, there was still found many insoluble matter and a transparent solution could not be obtained.

Comparative Example 3

A 1-liter autoclave equipped with a stirrer was charged with 140.0 g of acetone, 3.9 g (0.04 mole) of maleic anhydride and 70.1 g (0.7 mole) of ethyl acrylate, and the mixture was stirred for 30 minutes to give a solution. Thereafter the air in the autoclave was replaced by nitrogen, and the autoclave was charged with 13.5 g (0.24 mole) of isobutene, and the mixture was heated up to 75° C.

Then a separately prepared solution of 1.97 g (0.012 mole) of 2,2′-azobisisobutyronitrile, 15.7 g (0.16 mole) of maleic anhydride and 70.1 g (0.7 mole) of ethyl acrylate in 90.0 g of acetone was continuously fed over 5 hours, and polymerization was further effected at 75° C. for 3 hours.

After completion of the polymerization, the reaction mixture was taken out of the autoclave, air dried overnight, and further dried at 80° C. under reduced pressure, to give 164.8 g of a terpolymer. The molar ratio of isobutylene units, maleic anhydride units and ethyl acrylate units of the obtained resin was determined by $^1$H—NMR spectroscopy to be 1:1.0:6.9.

The properties of the obtained resin were found to be as follows.

1. Average molecular weight (determined by GPC and converted based on polystyrene):
   Number average molecular weight=20,700.
   Weight average molecular weight=68,400.
2. Acid value: 144 mgKOH/g.
3. Glass transition point (determined by DSC): 6° C.
4. Thermal degradation initiating temperature (determined by TGA, in $N_2$ atmosphere): 211° C.
5. Infrared absorption spectra:
   As in Example 1, the absorption spectra of each structural unit were identified.

The obtained resin was heat-press molded at 150° C. into a sheet with a thickness of 0.5 mm. The obtained sheet was tested for tensile properties using Instron (Trade name, manufactured by Instron Japan Incorp.) at an extension rate of 50 mm/min. The obtained results were as follows.

Tensile Test

Tensile breaking strength: 38 kg/cm$^2$.
Tensile breaking elongation: 92%.

Separately, 10 g of the terpolymer was placed in 63.22 g of an aqueous sodium hydroxide solution (containing 0.92 g of NaOH) at 90° C. and the mixture was stirred for 4 hours. However, there was still found many insoluble matter and a transparent solution could not be obtained.

Accordingly, the terpolymer of the present Example showed satisfactory heat processability and gave a film having satisfactory characteristics, but it did not show sufficient solubility in aqueous alkaline solution.

Comparative Example 4

A 1-liter autoclave equipped with a stirrer was charged with 294.0 g of acetone, 9.8 g (0.1 mole) of maleic anhydride and 82.9 g (0.45 mole) of 2-ethylhexyl acrylate, and the mixture was stirred for 30 minutes to give a solution. Thereafter the air in the autoclave was replaced by nitrogen, and the autoclave was charged with 33.7 g (0.6 mole of isobutene, and the mixture was heated up to 70° C.

Then a separately prepared solution of 1.97 g (0.012 mole) of 2,2′-azobisisobutyronitrile, 39.2 g (0.4 mole) of maleic anhydride and 55.3 g (0.3 mole) of n-butyl acrylate in 100.0 g of acetone was continuously fed over 5 hours, and polymerization was further effected at 70° C. for 3 hours.

After completion of the polymerization, the reaction mixture was taken out of the autoclave, air-dried overnight, and further dried at 100° C. under reduced pressure, to give 187.7 g of a terpolymer, which amount was significantly smaller than the theoretical value of 215.3 g. This is considered to be due to the fact that 2-ethylhexyl acrylate having a lower reactivity remained unreacted partly. This is supported by the very small amount of unreacted maleic anhydride being found. The molar ratio of isobutylene units, maleic anhydride units and and 2-ethylhexyl acrylate units of the terpolymer was determined by $^1$H—NMR spectroscopy to be 1:1.0:0.61.

The properties of the obtained resin were found to be as follows.

1. Average molecular weight (determined by GPC and converted based on polystyrene):
   Number average molecular weight=16,300.
   Weight average molecular weight=42,100.
2. Acid value: 296 mgKOH/g
3. Infrared absorption spectra:
   The presence of each of the structural units was confirmed.

Separately, 10 g of the terpolymer was placed in 69.3 g of an aqueous sodium hydroxide solution (containing 1.9 g of NaOH) at 90° C. and the mixture was stirred for 4 hours. However, there was still found many insoluble matter and a transparent solution could not be obtained, in spite of high acidity of the polymer. This fact shows that the polymer obtained had a non-uniform composition.

COMPARATIVE EXAMPLE 5

Example 1 was repeated except that the same mole of n-propyl acrylate was used instead of n-butyl acrylate, to conduct copolymerization of isobutylene, maleic anhydride and n-propyl acrylate, to obtain 151.1 g of a terpolymer.

The molar ratio of isobutylene units, maleic anhydride units and n-propyl acrylate units of the terpolymer was determined by $^1$H—HMR spectroscopy to be 1:1.0:1.9.

Properties of the obtained terpolymer were found to be as follows.

1. Average molecular weight (determined by GPC and converted based on polystyrene):
   Number average molecular weight=33,600.
   Weight average molecular weight=90,200.
2. Acid value: 302 mgKOH/g.
3. Glass transition point (determined by DSC): 17° C.
4. Thermal degradation initiating temperature. (determined by TGA, in $N_2$ atmosphere): 193° C.
5. Infrared absorption spectra:

In the same manner as in Example 1, the absorption spectra of each structural unit were identified.

It is noted that, among the above properties, the thermal degradation initiating temperature, which is an important property, was significantly lower (about 50° C.) than that in Example 1.

The obtained terpolymer resin was heat-pressed at 150° C. into a sheet. The sheet was tested for tensile properties in the same manner as in Example 1, to show a breaking strength of 66 kg/m$^2$ and an elongation of 31%. These results show that the effect of internal plasticization produced by n-propyl acrylate is smaller as compared with Example 1.

Comparative Example 6

Example 1 was repeated except that the same mole of n-pentyl acrylate was used instead of n-butyl acrylate, to conduct copolymerization of isobutylene, maleic anhydride and n-pentyl acrylate, to obtain 158.3 g of a terpolymer, which amount was significantly smaller than the theoretical value of 175.4 g. This is considered to be, from the very small amount of maleic anhydride having remained unreacted, due to the fact that, like Comparative Example 4, n-pentyl acrylate having a lower reactivity remained unreacted partly.

The molar ratio of isobutylene units, maleic anhydride units and n-pentyl acrylate units of the terpolymer was determined by $^1$H—NMR spectroscopy to be 1:1.0:1.7.

Properties of the obtained terpolymer were found to be as follows.

1. Average molecular weight (determined by GPC and converted based on polystyrene):
   Number average molecular weight=21,600.
   Weight average molecular weight=62,300.
2. Acid value: 293 mgKOH/g.
3. Infrared absorption spectra:

In the same manner as in Example 1, the absorption spectra of each structural unit were identified.

The average molecular weight is considerably smaller than that in Example 1, because of smaller copolymerization reactivity of n-pentyl acrylate than that of n-butyl acrylate.

Separately, 10 g of the terpolymer was placed in 69.3 g of an aqueous sodium hydroxide solution (containing 1.9 g of NaOH) at 90° C. and the mixture was stirred for 4 hours. However, there was still found many insoluble matter and a transparent solution could not be obtained. This fact shows that the copolymer obtained had a non-uniform composition.

Comparative Example 7

Example 1 was repeated except that the same mole of n-hexyl acrylate was used instead of n-butyl acrylate, to conduct copolymerization of isobutylene, maleic anhydride and n-hexyl acrylate, to obtain 165.4 g of a terpolymer, which amount was significantly smaller than the theoretical value of 186.6 g. This is considered to be, like Comparative Examples 4 and 5, due to the low copolymerization reactivity of n-hexyl acrylate.

The molar ratio of isobutylene units, maleic anhydride units and n-hexyl acrylate units of the polymer was determined by $^1$H—NMR spectroscopy to be 1:1.0:1.66.

Properties of the obtained terpolymer were found to be as follows.

1. Average molecular weight (determined by GPC and converted based on polystyrene):
   Number average molecular weight=19,200.
   Weight average molecular weight=54,700.
2. Acid value: 270 mgKOH/g.
3. Infrared absorption spectra:

The absorption spectra of each structural unit were identified.

The average molecular weight is significantly smaller than that in Example 1, because of smaller copolymerization reactivity of n-pentyl acrylate than that of n-butyl acrylate.

Separately, 10 g of the terpolymer was placed in 68.7 g of an aqueous sodium hydroxide solution (containing 1.8 g of NaOH) at 90° C. and the mixture was stirred for 4 hours. However, there was still found many insoluble matter and a transparent solution could not be obtained. This fact shows that the copolymer obtained had a non-uniform composition.

Example 3

A 1-liter autoclave equipped with a stirrer was charged with 93.8 g of acetone, 6.1 g of maleic anhydride and 45.0 g of n-butyl acrylate and the mixture was stirred for 30 minutes to give a solution. Thereafter, the air in the autoclave was replaced by nitrogen, and then 16.8 g of isobutene was added and the resulting mixture was heated up to 75° C.

Then, a separately prepared mixed solution of 43.0 g of maleic anhydride, 105.0 g of n-butyl acrylate and 3.2 g of 2,2'-azobis(2-methylbutyronitrile) in 218.8 g of acetone, and 39.3 g of isobutene was successively fed over 8 hours, and polymerization was further effected for 1 hour, thus totalling 9 hours, at 75° C.

After completion of the polymerization, the reaction mixture was taken out of the autoclave, air-dried overnight and further dried at 80° C. under reduced pressure to give 221.4 g of a polymer.

The obtained polymer had a weight average molecular weight (Mw) of 73,800 and a number average molecular weight (Mn) of 31,100 both as determined by GPC and converted based on polystyrene. The polymer showed an acid value of 250 mgKOH/g, a glass transition temperature (Tg) observed by DSC of 10° C. Infrared absorption spectroscopy on the polymer confirmed the presence of the absorptions originating from isobutylene unit at 1,390 cm$^{-1}$ and 1,370 cm$^{-1}$, those from maleic anhydride unit at 1,850 cm$^{-1}$ and 1,770 cm$^{-1}$ and that from n-butyl acrylate unit at 1,730 cm$^{-1}$. The molar ratio of isobutylene units, maleic anhydride units and n-butyl acrylate units calculated from data measured by $^1$H—NMR spectroscopy was 1:1:2.3.

The obtained copolymer was melt formed into a film having a thickness of 0.2 mm. The film was then sandwiched between a pair of stainless plates of 50-mm length and 25-mm width (length of overlapped part bonded: 12.5 mm) and heat-pressed at 150° C., 5 kg/cm² for 2 minutes to bond the stainless plates. The stainless plates thus bonded were subjected to tensile test with Instron (rate of extension: 20 cm/min, n=3), to show bond strengths ranging from 40 to 50 kg/cm². Separately, the stainless plates thus bonded were immersed in a 4% aqueous NaOH solution at 70° C. for 30 minutes. The copolymer then dissolved and the 2 stainless plates were separated.

Example 4

Bonding test of the above copolymer was conducted using a pair of plywood plates. Tensile strengths ranging from 50 to 60 kg/cm² were obtained. The bonded plates were, separately, tested for delamination with alkaline water and confirmed to delaminate caused by dissolution of the copolymer.

Example 5

Bonding test of the above copolymer was conducted using a pair of cardboards having a thickness of 1 mm. The substrate cardboard broke instead of the adhesion interface, proving that the bond strength was at least 14 kg/cm².

The bonded boards were, separately, tested for delamination with alkaline water and confirmed to delaminate readily caused by dissolution of the copolymer.

Example 6

A hot-melt adhesive was prepared by melt-mixing 80 parts of the copolymer used in Example 3 and 20 parts of an alkaline water-soluble rosin (KR-610, made by Arakawa Chemical Industries, Ltd.). Sample pieces were obtained by applying the thus prepared adhesive with a hot melt coater onto the cardboard used in Example 5 to a thickness of 50 μm, on which another cardboard was laid and pressed.

The above sample showed a tensile strength of at least 14 kg/cm² (failure of the substrate).

The sample was subjected to delamination test with a 4% aqueous NaOH solution at 70° C., and found to delaminate after 10 minutes of immersion.

Example 7

A 1-liter autoclave equipped with a stirrer was charged with 91.1 g of acetone, 10.6 g of maleic anhydride and 25.7 g of n-butyl acrylate and the mixture was stirred for 30 minutes to give a solution. Thereafter, the air in the autoclave was replaced by nitrogen, and then 33.7 g of isobutene was added and the resulting mixture was heated up to 75° C.

Then, a separately prepared mixed solution of 38.5 g of maleic anhydride, 19.2 g of n-butyl acrylate and 1.6 g of 2,2'-azobis(2-methylbutyronitrile) in 212.6 g of acetone were successively fed over 8 hours, and polymerization was further effected for 1 hour, thus totalling 9 hours, at 75° C.

After completion of the polymerization, the reaction mixture was taken out of the autoclave, air-dried overnight and further dried at 80° C. under reduced pressure to give 118.9 g of a polymer.

The obtained polymer had a weight average molecular weight (Mw) of 56,400 and a number average molecular weight (Mn) of 24,300 both as determined by GPC and converted based on polystyrene. The polymer showed an acid value of 489 mgKOH/g, a glass transition temperature (Tg) observed by DSC of 60° C.

The molar ratio of isobutylene units, maleic anhydride units and n-butyl acrylate units calculated from data measured by $^1$H—NMR spectroscopy was 1:1:0.67.

The obtained copolymer was melt formed into a film having a thickness of 0.2 mm. The film was then sandwiched between a pair of stainless plates of 50-mm length and 25-mm width (length of overlapped part bonded: 12.5 mm) and heat-pressed at 200° C., 5 kg/cm² for 2 minutes to bond the stainless plates. The stainless plates thus bonded were subjected to tensile test with Instron (rate of extension: 20 cm/min, n=3), to show bond strengths ranging from 45 to 60 kg/cm².

Separately, the stainless plates thus bonded were immersed in a 4% aqueous NaOH solution at 70° C. for 20 minutes. The copolymer then dissolved and the 2 stainless plates were separated.

Example 8

A 1-liter autoclave equipped with a stirrer was charged with 93.8 g of acetone, 6.1 g of maleic anhydride and 45.0 g of n-butyl acrylate and the mixture was stirred for 30 minutes to give a solution. Thereafter, the air in the autoclave was replaced by nitrogen, and then 16.8 g of isobutylene was added and the resulting mixture was heated up to 75° C.

Then, a separately prepared mixed solution of 43.0 g of maleic anhydride, 105.0 g of n-butyl acrylate and 3.2 g of 2,2'-azobis(2-methylbutyronitrile) in 218.8 g of acetone were successively fed over 8 hours, and polymerization was further effected for 1 hour, thus totalling 9 hours, at 75° C.

After completion of the polymerization, the reaction mixture was taken out of the autoclave, air-dried overnight and further dried at 80° C. under reduced pressure to give 221.4 g of a polymer.

The obtained polymer had a weight average molecular weight (Mw) of 73,800 and a number average molecular weight (Mn) of 31,100 both as determined by GPC and converted based on polystyrene. The polymer showed an acid value of 250 mgKOH/g, a glass transition temperature Tg) observed by DSC of 10° C. Infrared absorption spectroscopy on the polymer confirmed the presence of the absorptions originating from isobutylene unit at 1,390 cm$^{-1}$ and 1,370 cm$^{-1}$, those from maleic anhydride unit at 1,850 cm$^{-1}$ and 1,770 cm$^{-1}$ and that from n-butyl acrylate unit at 1,730 cm $^{-1}$. The molar ratio of isobutylene units, maleic anhydride units and n-butyl acrylate units calculated from data measured by $^1$H—NMR spectroscopy was 1:1:2.3.

An adhesive according to the present invention was prepared by dissolving 45 parts of the obtained copolymer in 15 parts of toluene. The adhesive was applied with a bar coater onto a stainless steel plate having a 50 mm length×25 mm width to a thickness of 100 μm. After the applied layer had been air-dried at room temperature for 30 minutes, another stainless steel plate with the same size was laid on the adhesive-applied surface (length of overlapped part: 12.5 mm) and the pair was heat pressed at 150° C., 5 kg/cm² for 2 minutes.

The stainless plates thus bonded were subjected to tensile test with Instron (rate of extension: 20 cm/min, n=3), to show bond strengths ranging from 40 to 48 kg/cm².

Separately, the stainless plates thus bonded were immersed in a 4% aqueous NaOH solution at 70° C. for 30 minutes. The copolymer then dissolved and the 2 stainless plates were separated.

Example 9

Bonding test of the above adhesive was conducted using a pair of plywood plates. Tensile strengths ranging from 51 to 59 kg/cm$^2$ were obtained. The bonded plates were, separately, tested for delamination with alkaline water and confirmed to delaminate caused by dissolution of the copolymer.

Example 10

Bonding test of the above adhesive was conducted using a pair of cardboards having a thickness of 1 mm. The substrate cardboard broke instead of the adhesion interface, proving that the bond strength was at least 14 kg/cm$^2$.

The bonded boards were, separately, tested for delamination with alkaline water and confirmed to delaminate readily caused by dissolution of the copolymer.

Example 11

An adhesive according to the present invention was prepared by dissolving 40 parts of the copolymer used in Example 8 and an alkaline water-soluble rosin (RK-610, made by Arakawa Chemical Industries, Ltd.) in 15 parts of acetone. The adhesive was applied with a bar coater onto a cardboard used in Example 10 to a thickness of 100 μm. Immediately thereafter, another cardboard was laid on the adhesive-applied surface (length of overlapped part: 12.5 mm) and the pair was allowed to stand for 30 minutes at a room temperature to be dried.

The above sample showed tensile strengths (rate of extension: 20 cm/min) of at least 14 kg/cm$^2$ (substrate failure).

The bonded boards were, separately, tested for delamination with a 4% aqueous alkaline solution at 70° C. and found to delaminate upon immersion for 10 minutes.

Example 12

A 1-liter autoclave equipped with a stirrer was charged with 91.1 g of acetone, 10.6 g of maleic anhydride and 25.7 g of n-butyl acrylate and the mixture was stirred for 30 minutes to give a solution. Thereafter, the air in the autoclave was replaced by nitrogen, and then 33.7 g of isobutene was added and the resulting mixture was heated up to 75° C.

Then, a separately prepared mixed solution of 38.5 g of maleic anhydride, 19.2 g of n-butyl acrylate and 1.6 g of 2,2'-azobis(2-methylbutyronitrile) in 212.6 g of acetone were successively fed over 8 hours, and polymerization was further effected for 1 hour, thus totalling 9 hours, at 75° C.

After completion of the polymerization, the reaction mixture was taken out of the autoclave, air-dried overnight and further dried at 80° C. under reduced pressure to give 118.9 g of a polymer.

The obtained polymer had a weight average molecular weight (Mw) of 56,400 and a number average molecular weight (Mn) of 24,300 both as determined by GPC and converted based on polystyrene. The polymer showed an acid value of 489 mgKOH/g, a glass transition temperature (Tg) observed by DSC of 60° C. The molar ratio of isobutylene units, maleic anhydride units and n-butyl acrylate units calculated from data measured by $^1$H—NMR spectroscopy was 1:1:0.67.

An adhesive according to the present invention was prepared by dissolving 40 parts of the obtained copolymer in 10 parts of acetone. The adhesive was applied with a bar coater onto a stainless steel plate having a 50 mm length×25 mm width to a thickness of 100 μm. After the applied layer had been air-dried at room temperature for 30 minutes, another stainless steel plate with the same size was laid on the adhesive-applied surface (length of overlapped part: 12.5 mm) and the pair was heat pressed at 150° C., 5 kg/cm$^2$ for 2 minutes.

The stainless plates thus bonded were subjected to tensile test with Instron (rate of extension: 20 cm/min, n=3), to show bond strengths ranging from 47 to 60 kg/cm$^2$.

Separately, the stainless plates thus bonded were immersed in a 4% aqueous NaOH solution at 70° C. for 30 minutes. The copolymer then dissolved and the 2 stainless plates were separated.

Obviously, numerous modifications and variations of the present invention are possible in light of the above teachings. It is therefore to be understood that within the scope of the appended claims, the invention may be practiced otherwise than as specifically described herein.

What is claimed is:

1. An alkaline water-soluble thermoplastic resin comprising units from isobutylene, units from maleic anhydride and units from n-butyl acrylate with the molar ratio of the isobutylene units, maleic anhydride units and n-butyl acrylate units being 1:0.8–1.2:0.2–5.0.

2. An alkaline water-soluble thermoplastic resin according to claim 1, having a molecular weight of 5,000 to 500,000.

3. An adhesive comprising a terpolymer comprising units from isobutylene, units from maleic anhydride and units from n-butyl acrylate in a molar ratio of 1:0.5–1.5:0.2–5.0.

4. An adhesive according to claim 3, wherein said terpolymer has a molecular weight of 5,000 to 500,000.

5. A hot-melt adhesive formulation comprising the adhesive according to claim 3.

6. An adhesive solution comprising an adhesive according to claim 3 dissolved in an organic solvent.

* * * * *